United States Patent
Vodev

(10) Patent No.: US 10,710,669 B2
(45) Date of Patent: Jul. 14, 2020

(54) FOLDABLE FORK FOR A BICYCLE

(71) Applicant: Valentin Jordanov Vodev, Vienna (AT)

(72) Inventor: Valentin Jordanov Vodev, Vienna (AT)

( * ) Notice: Subject to any disclaimer, the term of this patent is extended or adjusted under 35 U.S.C. 154(b) by 142 days.

(21) Appl. No.: 15/911,101

(22) Filed: Mar. 3, 2018

(65) Prior Publication Data

US 2018/0251185 A1   Sep. 6, 2018

Related U.S. Application Data

(60) Provisional application No. 62/467,080, filed on Mar. 3, 2017.

(51) Int. Cl.
*B62K 21/24* (2006.01)
*B62K 15/00* (2006.01)
*B62K 21/02* (2006.01)

(52) U.S. Cl.
CPC .............. *B62K 21/24* (2013.01); *B62K 15/00* (2013.01); *B62K 15/006* (2013.01); *B62K 21/02* (2013.01)

(58) Field of Classification Search
CPC ................................ B62K 21/24; B62K 15/00
USPC ........................................................ 280/279
See application file for complete search history.

(56) References Cited

U.S. PATENT DOCUMENTS

| 645,145 | A | * | 3/1900 | Trebert | B62K 15/006 280/278 |
|---|---|---|---|---|---|
| 2007/0007744 | A1 | * | 1/2007 | Colman | B62K 15/008 280/278 |
| 2009/0079160 | A1 | * | 3/2009 | Lai | B62K 21/16 280/279 |
| 2010/0117330 | A1 | * | 5/2010 | Lewis | B62K 19/22 280/279 |
| 2017/0190378 | A1 | * | 7/2017 | Treadway | B62K 15/008 |

* cited by examiner

*Primary Examiner* — Jacob D Knutson
(74) *Attorney, Agent, or Firm* — Michael D. Eisenberg

(57) ABSTRACT

A foldable fork of a bicycle, comprising a stem having a first end and a second end; a pair of prongs configured to receive an axle of a bicycle wheel; and a pivot having an axis that is angled with respect to the axle of a bicycle wheel when connected to the prongs, the pivot connected to the second end of the stem on a top section of the pivot and connected to the pair of prongs on a bottom section of the pivot. The top section of the pivot is configured to receive the bottom section of the pivot. When the bottom section of the pivot is rotated away from the top section, a wheel connected to the prongs is offset by a distance to a side of a frame connected to the bicycle.

11 Claims, 11 Drawing Sheets

PRESENT INVENTION

FOLDABLE FORK FOR A BICYCLE

CROSS-REFERENCES TO RELATED APPLICATIONS

This application claims priority from U.S. Provisional Application Ser. No. 62/467,080 filed Mar. 3, 2017, which is hereby incorporated herein by reference in its entirety.

FIELD OF THE INVENTION

The present invention relates to a foldable fork for bicycles.

BACKGROUND OF THE INVENTION

The design of the currently existing forks for folding a bicycle includes a stem having a first end and a second end, with the first end of the stem having a hole for insertion of a handlebar stem of the bicycle, and the second end of the stem having a pivot. From the pivot extends a pair of prongs, each having an end with a claw for attaching to an axle of a wheel of the bicycle. The pivot is in-line with both the first end of the stem and the ends of the prongs. The fork is used to fold the wheel around a frame of the bicycle.

The issue with the current design is that the pivot has limited mobility and cannot rotate to properly accommodate the bicycle while folding. That is, when folded, the wheel will interfere with the frame of the bicycle. The frame often needs to be bent in order to accommodate the wheel, and this results in a weakened frame and reduced life of the bicycle. The present invention addresses this issue because it comprises a two-part mechanism that allows the wheel to fold back and be offset from the frame, thus allowing for a neat fold with no interference of the frame with the wheel. The frame is straight and has no bends or curves, namely, it does not need to be bent to accommodate a wheel folded back, it can be a normal frame or a frame from a non-foldable bike. This increases the life of the frame, and thus the bicycle as a whole.

BRIEF SUMMARY OF THE EMBODIMENTS OF THE INVENTION

Figure 1:
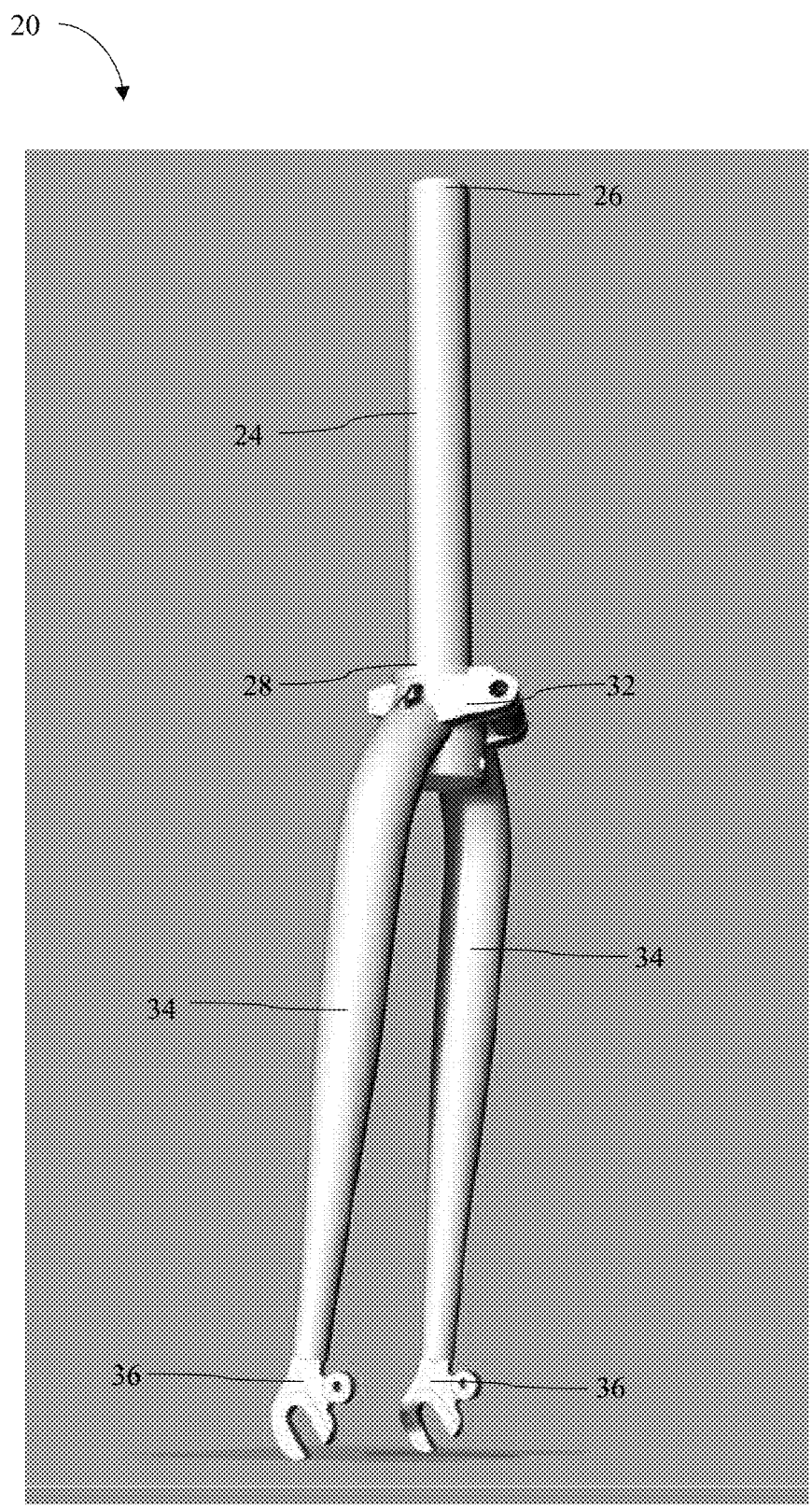
FIG. 1 illustrates a perspective side view of the folding fork of the present invention.

In a variant, a foldable fork of a bicycle comprises a stem having a first end and a second end; a pair of prongs configured to receive an axle of a bicycle wheel; and a pivot. The pivot has an axis that is angled with respect to the axle of a bicycle wheel when the axle is connected to the prongs. The pivot is connected to the second end of the stem on a top section of the pivot and connected to the pair of prongs on a bottom section of the pivot. The top section of the pivot is configured to receive the bottom section of the pivot. The stem is configured to disengage from the pair of prongs when the bottom section of the pivot is rotated away from the top section of the pivot and a connected wheel is disposed to a side of a connected frame of the bicycle.

In another variant, the first end of the stem has a hole that is configured to receive a handlebar.

In a further variant, the stem has a cylindrical shape.

In yet another variant, the prongs are parallel to each other and extend away from the pivot.

In another variant, each prong has a claw extending from a tapered end that is configured to receive the axle of a bicycle wheel.

In a further variant, the pivot is configured to rotate around an axis oriented at an angle relative to an axis of a front wheel of a bicycle.

In yet another variant, the pivot comprises a wedge having a first edge that opposes a second edge.

In another variant, the first edge is wider than the second edge.

In a further variant, both edges are perpendicular to the pivot.

In yet another variant, the pivot is configured to rotate on the second edge.

In another variant, the axis of the pivot is oriented at an acute angle with respect to a connected wheel axle when both the axis and the axle are projected onto a plane perpendicular to a line of sight from a rear of a connected bicycle frame. The axis of the pivot is oriented at an acute angle with respect to a connected wheel axle when both the axis and the axle are projected onto a plane perpendicular to a line of sight from above the foldable fork.

In a further variant, the axis of the pivot is oriented at an angle between 10 degrees and 30 degrees with respect to an axis of a connected wheel axle when both the pivot axis and the axle axis are projected onto a plane perpendicular to a line of sight from a rear of a connected bicycle frame. The axis of the pivot is oriented at an angle between 10 degrees and 30 degrees with respect to an axis of a connected wheel axle when both the pivot axis and the axle axis are projected onto a plane perpendicular to a line of sight from above the foldable fork.

In yet another variant, a foldable fork of a bicycle, comprises a stem having a first end and a second end; a pair of prongs configured to receive an axle of a bicycle wheel; and a pivot. The pivot has an axis that is angled with respect to the axle of a bicycle wheel when connected to the prongs. The pivot is connected to the second end of the stem on a top section of the pivot and connected to the pair of prongs on a bottom section of the pivot. The top section of the pivot is configured to receive the bottom section of the pivot. When the bottom section of the pivot is rotated away from the top section, a center of a wheel connected to the prongs is offset by a distance to a side of a frame connected to the bicycle.

In another variant, a method for folding a bicycle frame, comprises disengaging prongs from a stem via a hinge connection between the prongs and the stem; and rotating the prongs to a side of the frame while the stem remains stationary.

In a further variant, attaching a wheel between the prongs and rotating the wheel until it is parallel and adjacent to the frame.

Detailed Description of the Embodiments of the Invention

The following reference numbers are used in this document:
20 fork
22 bicycle
24 stem
26 first end of stem
26a hole
28 second end of stem
30 handlebar
32 pivot
34 pair of prongs
36 claw
38 wheel
38a axle
39 angle
39A, 39B projected angles
40 first end of pivot
41 axis around pivot
42 second end of pivot
43 axis around front wheel
44 broad edge
46 narrow edge
47 centerline of stem
48 member
50 male part
52 female part
54 frame
55 centerline of the wheel
65 centerline of p
105 Offset distance
110 No offset distance In a variant, referring generally to FIGS. 1-11, the present invention is directed toward a foldable fork 20 for folding a bicycle 22 and reducing the space required to store a bicycle. FIG. 1 shows the fork 20 comprises a stem 24 having a first end 26 and a second end 28. The stem 24 has a shape of a cylinder. At the first end 26 of the stem 24 is a hole 26a into which a handlebar stem 30 of the bicycle 22 is inserted. The second end 28 of the stem 24 has a pivot 32, or hinge connection 32 at which there is a pair of prongs 34 stemming off from the pivot 32. Thus, the pivot 32 divides the foldable fork 20 between the stem 24 and the prongs 34. The prongs 34 are parallel to each other and extend away from the second end 28 of the stem 24. Each prong 34 has a tapering end and a claw 36 for attaching the fork 20 to an axle 38a of a wheel 38 of the bicycle 22.

Figure 2:
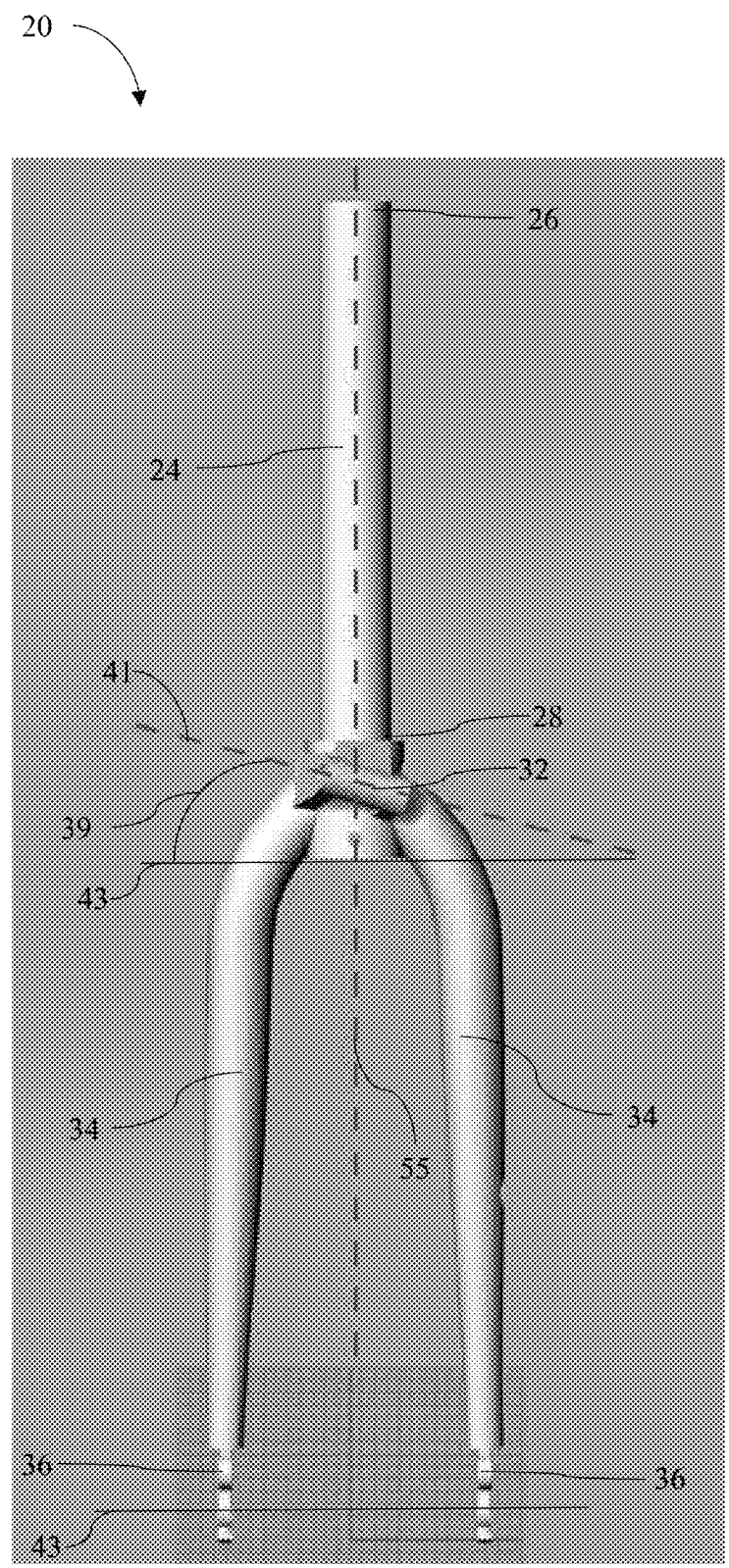
FIG. 2 illustrates a front view of the folding fork.
Figure 10:
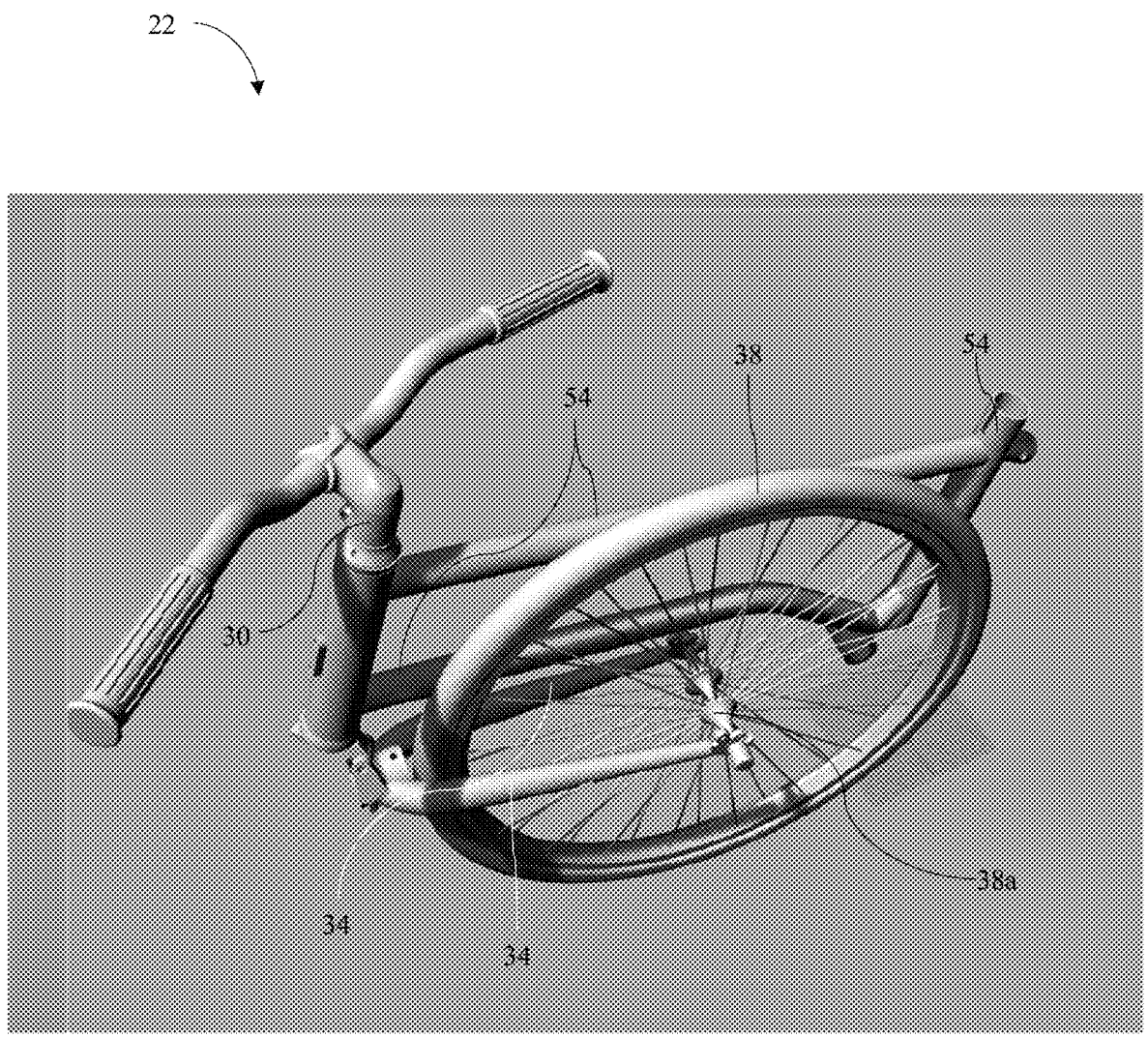
FIG. 10 illustrates a perspective view illustrating how when folded, the front wheel is disposed to the side of the bike's frame.
Figure 11:
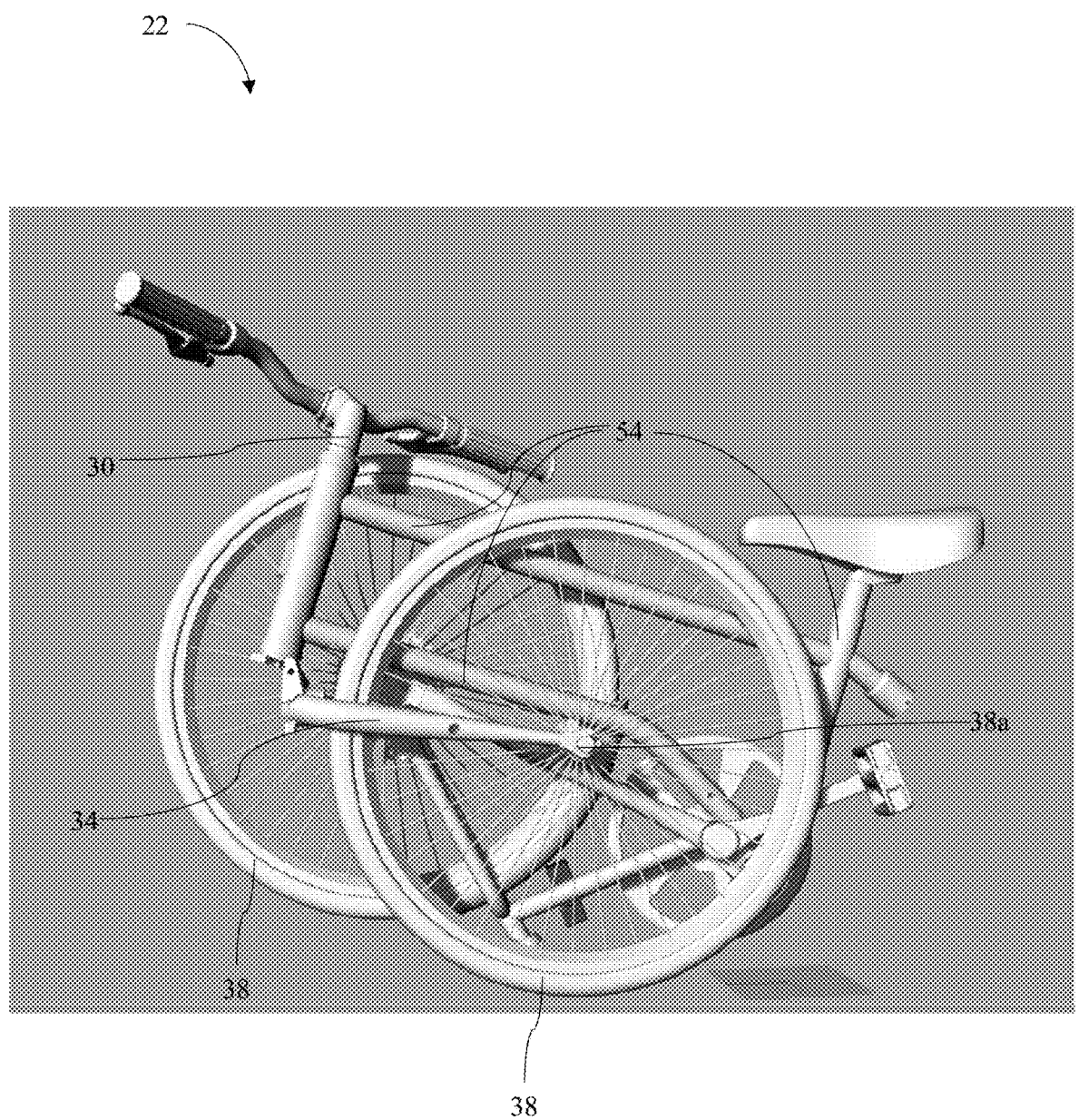
FIG. 11 illustrates a perspective view of both a front wheel and a real wheel rotated from their normal riding positions, into a folded state to compactly store the bike.

In another variant, referring to FIG. 2, the pivot 32 has an axis of rotation 41 that is oriented in space at an angle 39 relative to the axis of a front wheel 43. The axis of a front wheel 43 is shown in two locations, one below and one above for purposes of illustration to show the angle 39. The pivot 32 comprises an axis 41 that is angled with respect to the axle of a bicycle wheel 43 when connected to the prongs 34. The pivot 32 is connected to the second end 28 of the stem 24 on a top section of the pivot 40 and connected to the pair of prongs 34 on a bottom section of the pivot 42. The top section of the pivot 40 is configured to receive the bottom section of the pivot 42. Further, the stem 24 is configured to disengage from the pair of prongs 34 when the bottom section of the pivot 42 is rotated away from the top section of the pivot 40 and then allowing a connected wheel 43 to become disposed to a side of a connected frame 54 of the bicycle 22, as shown in FIGS. 10 and 11. FIG. 11 illustrates both front wheel and a real wheel rotated from their normal riding positions, into a folded state to compactly store the bike.

Figure 3A:
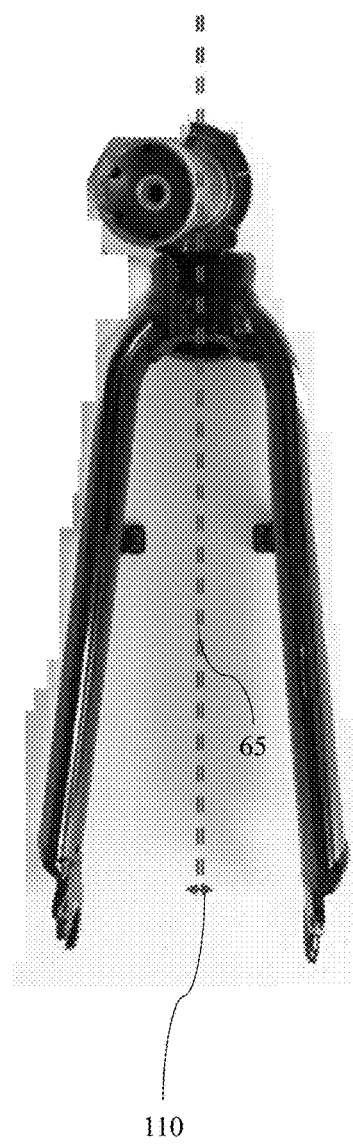
FIG. 3A illustrates a prior art folding fork.
Figure 3B:
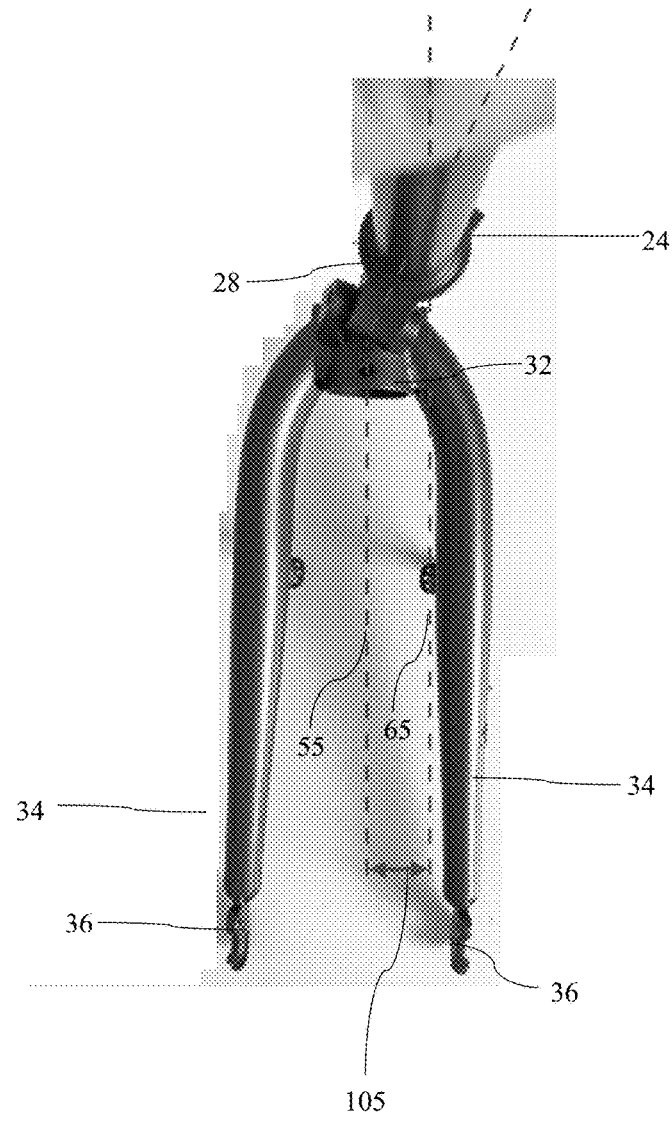
FIG. 3B illustrates a folding fork of the present invention in a folded state.
Figure 4:
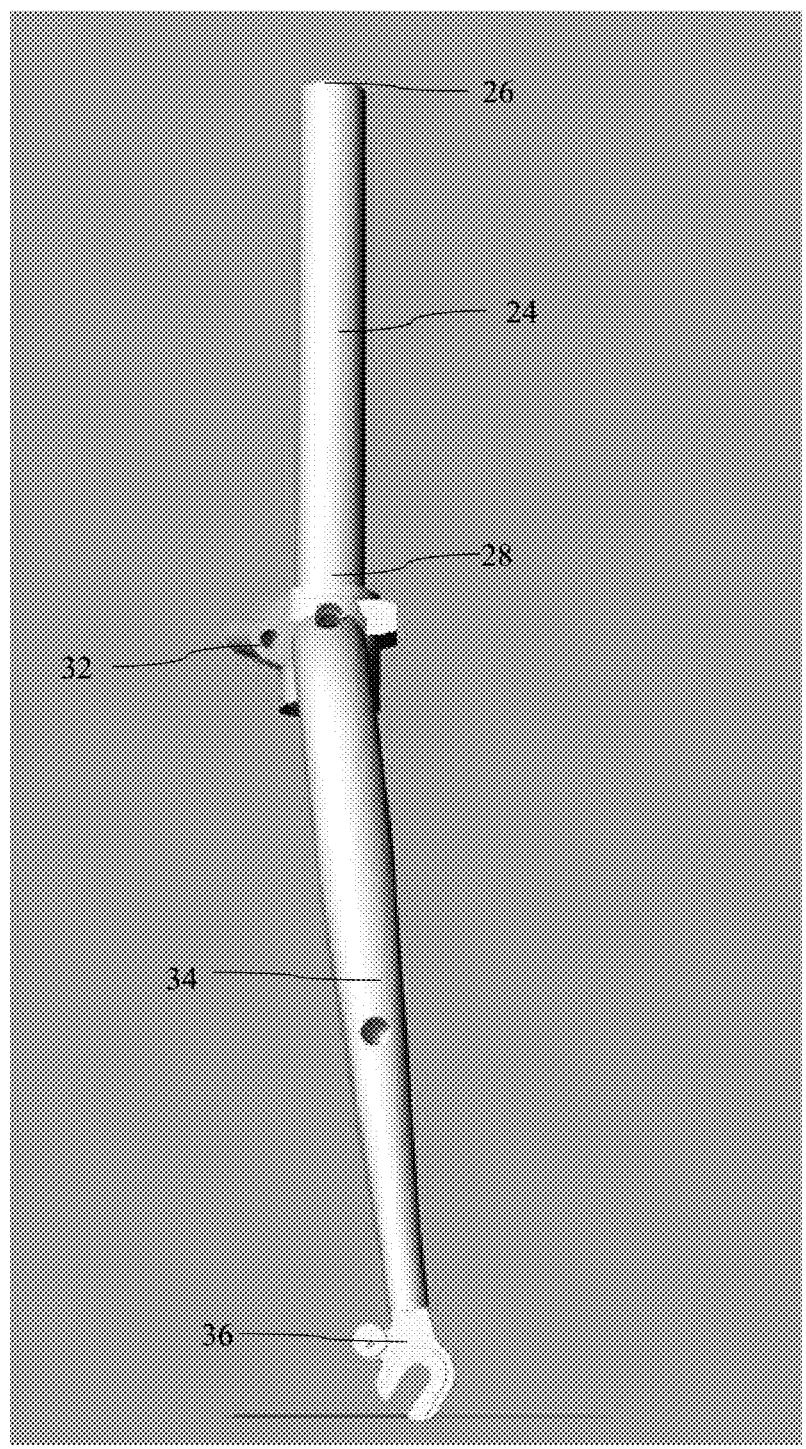
FIG. 4 illustrates a side view of the folding fork.

Referring to FIGS. 3A-3B, the fork 20 is used to fold a bicycle 22, which has a frame 54. The claws 36 are attached to an axle 38a of a wheel 38 of the bicycle 22. A handlebar stem 30 of the bicycle 22 is inserted into the hole 26a at the first end 26 of the stem 24. Referring to FIG. 3B, the angle 39 of the axis about the pivot 41 allows the wheel 38 to fold back and be offset 105 from the frame 54, in other words the center or centerline of the wheel 55 is offset relative to the plane defined by the centerline of the stem 47 and the frame 54, thus allowing for a neat fold with no interference of the frame 54 with the wheel 38. The plane defined by the centerline of the stem 47 and the frame 54 may be observed in FIG. 9, where two members of the frame 54 joined perpendicular with the stem 24, center lines of those members define a plane. The frame 54 is straight and has no bends or curves, namely, it does not need to be bent to accommodate a wheel 38 folded back, it can be a normal frame or a frame from a non-foldable bike. This increases the life of the frame 54, and thus the bicycle 22 as a whole. In contrast, referring to FIG. 3A, the prior art will provide no offset 110 when folded. A prior art centerline of a wheel 65, lines up with the plane of the frame 54 and centerline of the stem 47 when folded.

Figure 5:
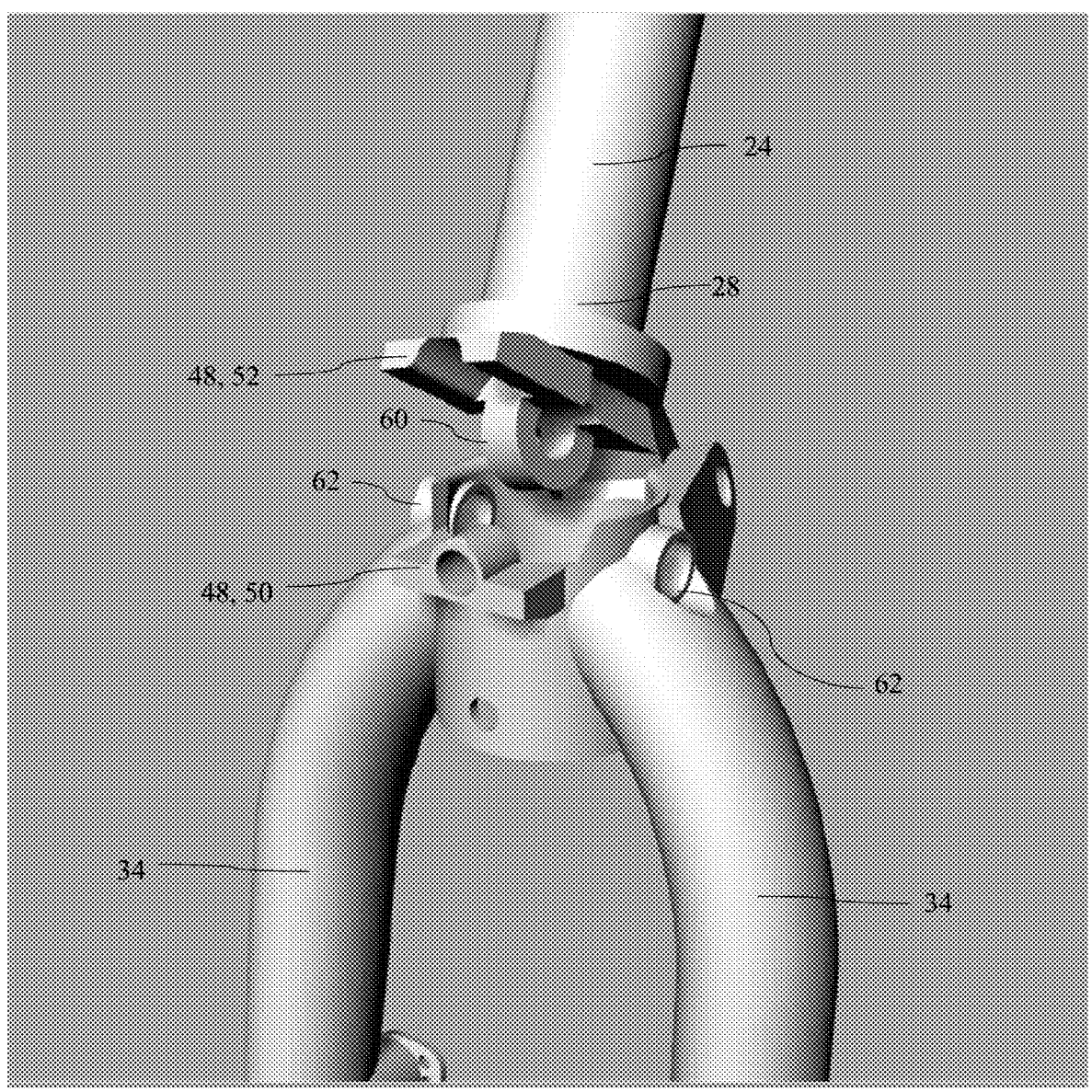
FIG. 5 illustrates a front close-up view of the folding fork.

In yet another variant, referring to FIG. 5, the second end 28 of the stem 24 additionally comprises a member 48 for disengaging the stem 24 from a wheel attachment piece which typically comprises a pair of prongs 34. The member 48 comprises a two-part mechanism in which a male part 50 snaps into and out of a corresponding female part 52. This provides a folding mechanism for the bicycle 22. In one variant, the male part 50 is a ring 60 with a hole that aligns with holes of two spaced apart cylinders which is the female part 52, so a rod (not shown) can be passed through to lock in place. The top and bottom male and female parts may be reversed.

Figure 6:
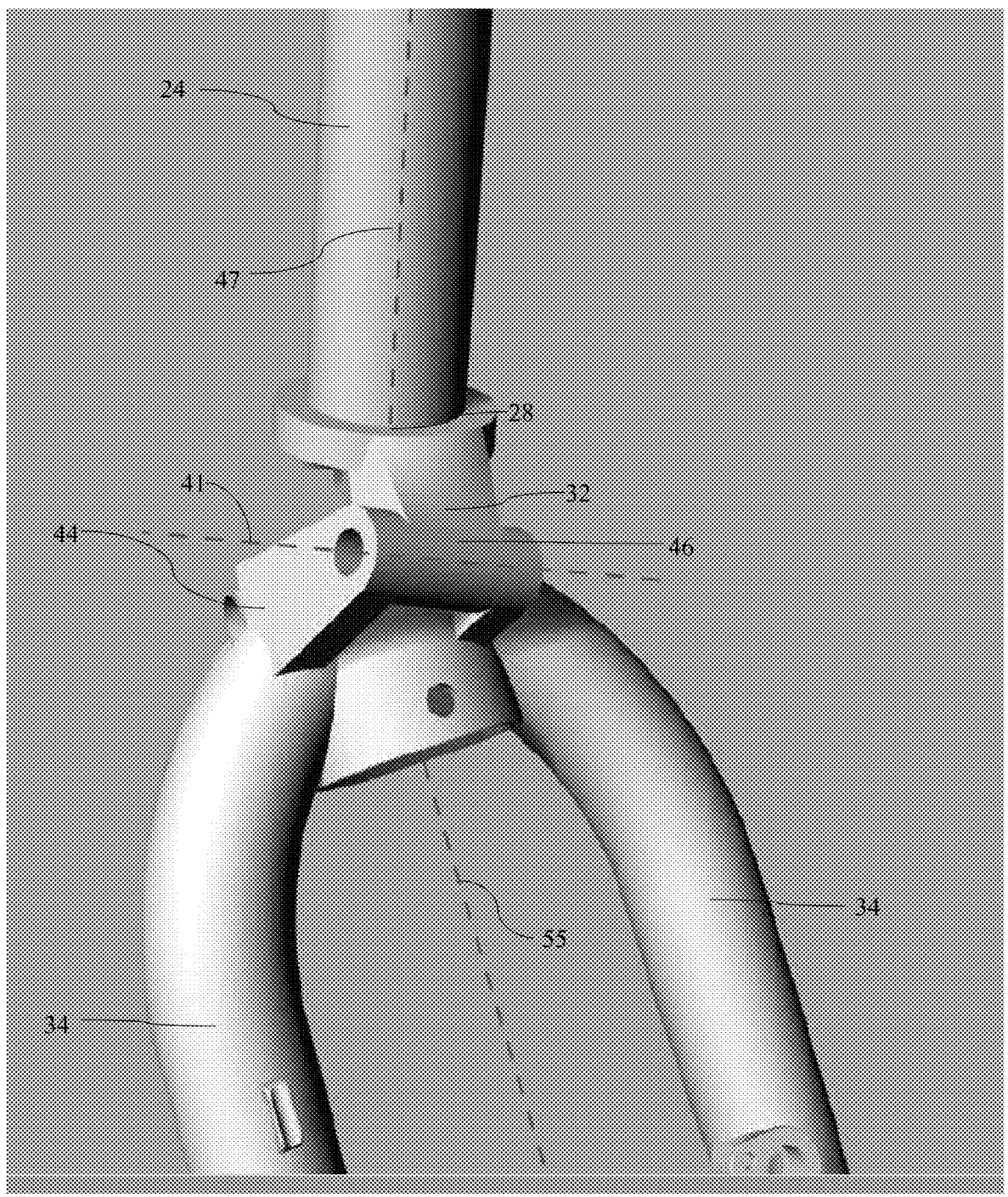
FIG. 6 illustrates a rear close-up view of the folding fork.

In another variant, referring to FIG. 6, the pivot 32 has a shape of a wedge, having a broad edge 44 opposite a narrow edge 46. These are both perpendicular to the first end 40 and the second end 42 of the pivot 32. The narrow edge 46 is where rotation of the pivot 32 takes place, and where the stem 24 is joined to the pivot 32.

Figure 7:
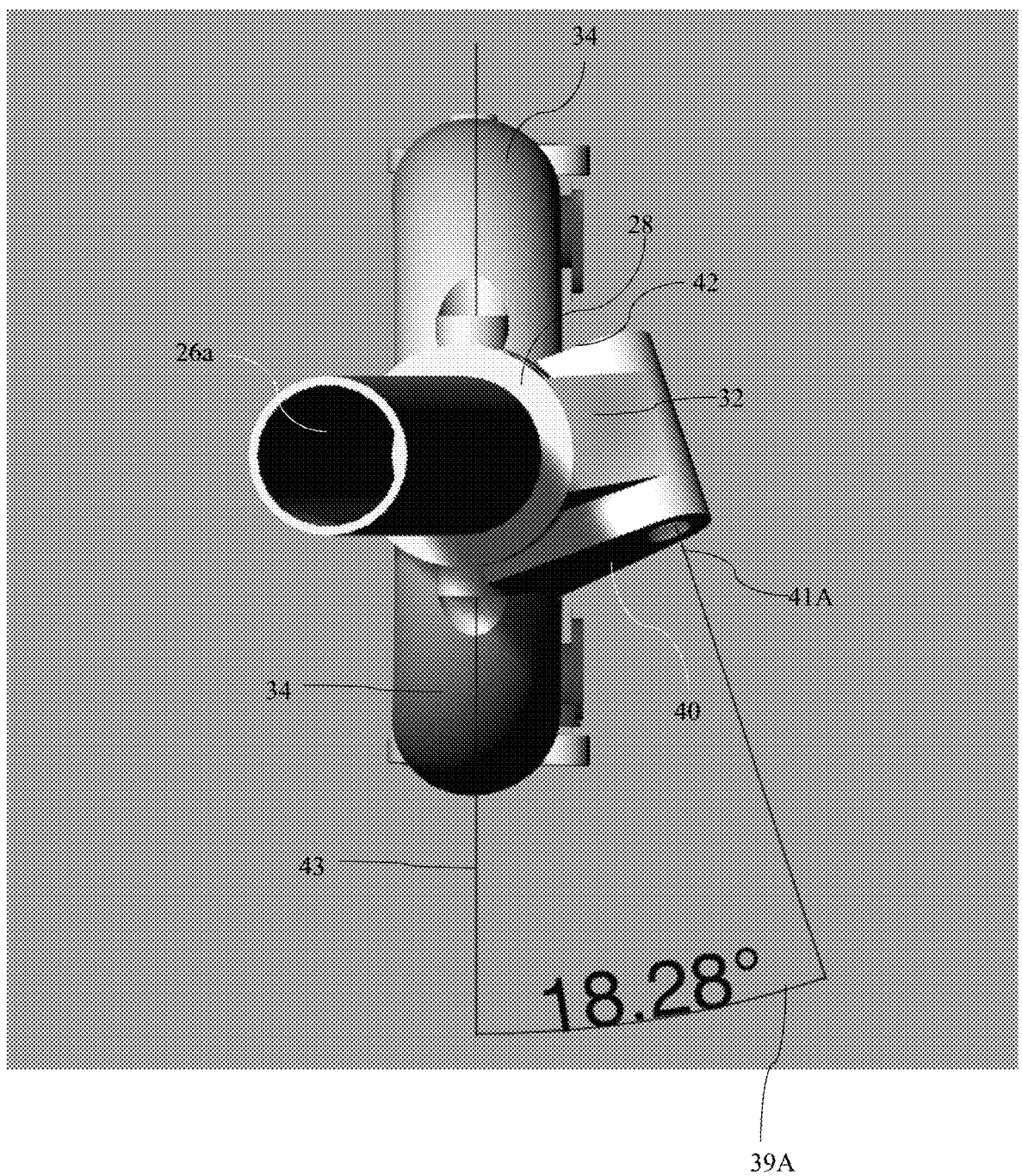
FIG. 7 illustrates a top view of the folding fork.

In a further variant, referring to FIG. 7, the pivot 32 is shown in plan view from above. The pivot 32 has a first end 40 and a second end 42. In one embodiment, the axis 41 about which the pivot rotates is oriented at an angle 39 with respect to an axis 43 about which a front wheel rotates that would connect to the folding fork 20. When this angle is projected 39A onto a plan view, which is a plane containing the axis 43 of a wheel connected to the folding fork 20 and perpendicular to a central long axis of the stem 24, this angle measures 18.28°.

Figure 8:
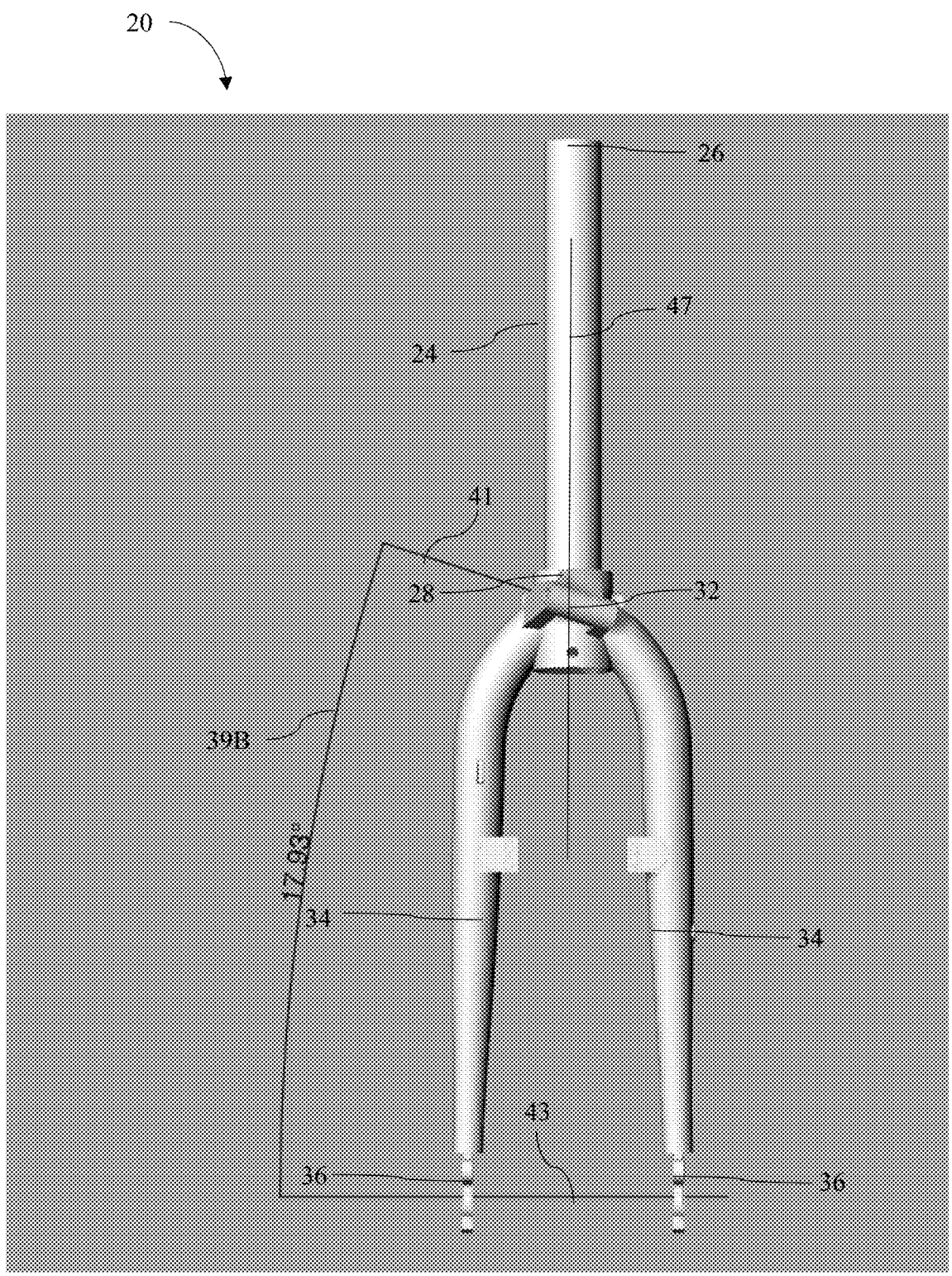
FIG. 8 illustrates a rear view of the folding fork of the present invention.
Figure 9:
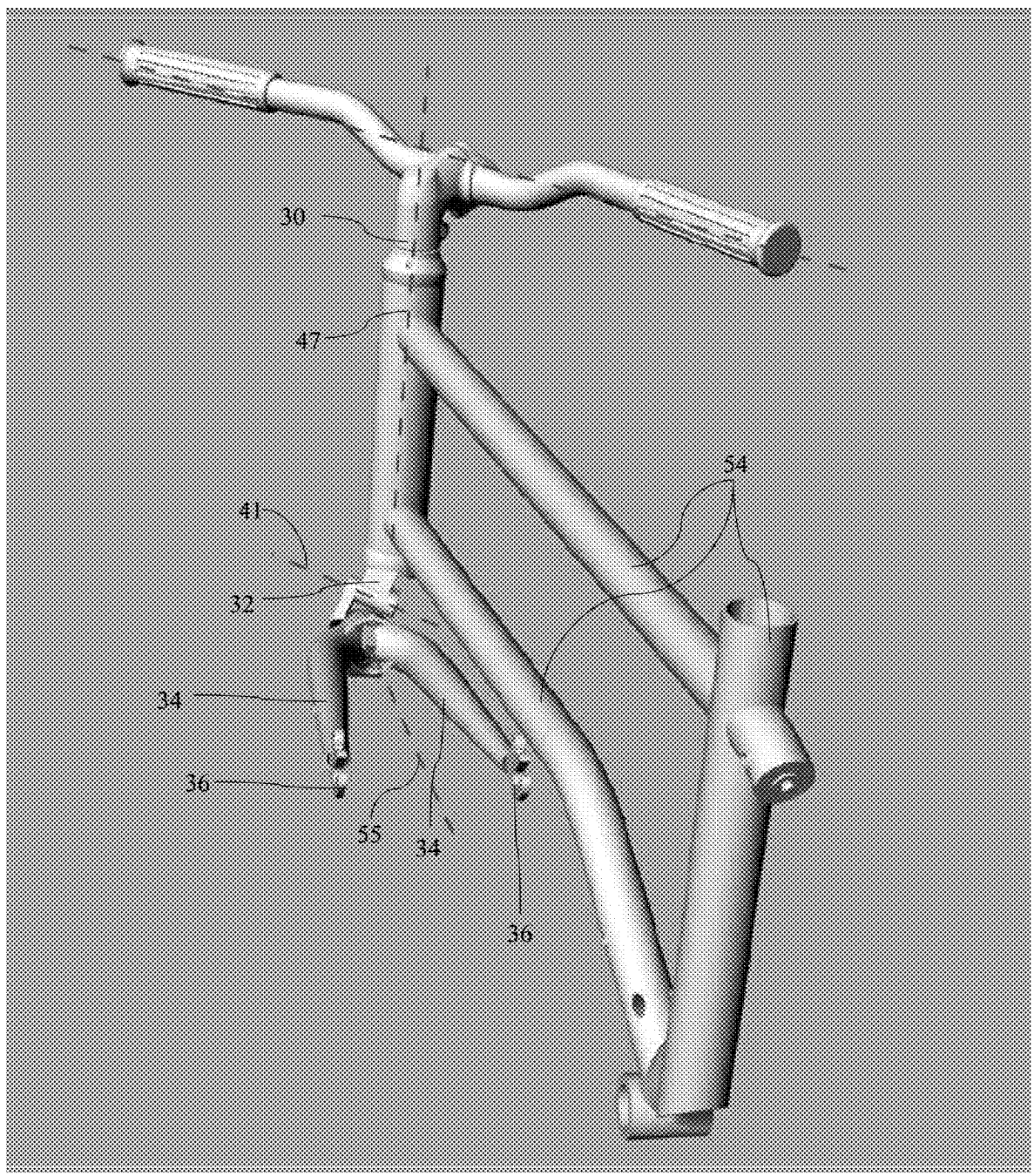
FIG. 9 illustrates a perspective view of the folding fork connected to a frame of a bicycle, when the fork is folded.

In yet another variant, referring to FIG. 8, when projected onto a rear view, which is a plane that contains lines parallel to a central long axis of the stem 24 and contains the axis 43 of the front wheel, the projected angle 39B between the axis 41 about the pivot 42 and the axis 43 about the front wheel is 17.93°.

What is claimed is:
1. A foldable fork of a bicycle, comprising:
a stem having a first end and a second end;

a pair of prongs configured to receive an axle of a bicycle wheel;

a pivot, having an axis that is angled with respect to the axle of the bicycle wheel when the axle is connected to the prongs, the pivot connected to the second end of the stem on a top section of the pivot and connected to the pair of prongs on a bottom section of the pivot;

wherein the top section of the pivot is configured to receive the bottom section of the pivot; and wherein the stem is configured to disengage from the pair of prongs when the bottom section of the pivot is rotated away from the top section of the pivot and wherein when connected, the bicycle wheel is disposed to a side of a connected frame of the bicycle;

wherein when a bicycle wheel is connected, the axis of the pivot is oriented at an acute angle with respect to an axle of the connected wheel when both the axis and the axle are projected onto a plane perpendicular to a line of sight from a rear of the connected bicycle frame; and wherein the axis of the pivot is oriented at an acute angle with respect to the axle of a connected wheel when both the axis and the axle are projected onto a plane perpendicular to a line of sight from above the foldable fork.

2. The fork of claim 1, wherein the first end of the stem has a hole that is configured to receive a handlebar.

3. The fork of claim 1, wherein the stem has a cylindrical shape.

4. The fork of claim 1, wherein the prongs are parallel to each other and extend away from the pivot.

5. The fork of claim 1, wherein each prong has a claw extending from a tapered end that is configured to receive the axle of the bicycle wheel.

6. The fork of claim 1, wherein the pivot is configured to rotate around the axis oriented at an angle relative to an axis of a front wheel of the bicycle.

7. The fork of claim 1, wherein the pivot comprises a wedge having a first edge that opposes a second edge.

8. The fork of claim 7, wherein the first edge is wider than the second edge.

9. The fork of claim 8, wherein the pivot is configured to rotate on the second edge.

10. The fork of claim 7, wherein both edges are perpendicular to the pivot.

11. A foldable fork of a bicycle, comprising:
    a stem having a first end and a second end;
    a pair of prongs configured to receive an axle of a bicycle wheel;

a pivot, having an axis that is angled with respect to the axle of the bicycle wheel when the axle is connected to the prongs, the pivot connected to the second end of the stem on a top section of the pivot and connected to the pair of prongs on a bottom section of the pivot;

wherein the top section of the pivot is configured to receive the bottom section of the pivot; and wherein the stem is configured to disengage from the pair of prongs when the bottom section of the pivot is rotated away from the top section of the pivot and wherein when connected, the bicycle wheel is disposed to a side of a connected frame of the bicycle;

wherein when a bicycle wheel is connected, the axis of the pivot is oriented at an angle between 10 degrees and 30 degrees with respect to an axle axis of the connected wheel when both the pivot axis and the axle axis are projected onto a plane perpendicular to a line of sight from a rear of the connected bicycle frame; and wherein the axis of the pivot is oriented at an angle between 10 degrees and 30 degrees with respect to the axle of a connected wheel when both the pivot axis and the axle axis are projected onto a plane perpendicular to a line of sight from above the foldable fork.

* * * * *